Aug. 18, 1964 R. P. HAWKINSON 3,144,684
MOLD FOR RETREADING TIRES
Filed June 25, 1962 2 Sheets-Sheet 1

INVENTOR.
RAYMOND P. HAWKINSON
BY
Merchant, Merchant & Gould
ATTORNEY

Aug. 18, 1964 R. P. HAWKINSON 3,144,684
MOLD FOR RETREADING TIRES
Filed June 25, 1962 2 Sheets-Sheet 2

INVENTOR.
RAYMOND P. HAWKINSON
BY
ATTORNEYS

United States Patent Office 3,144,684
Patented Aug. 18, 1964

3,144,684
MOLD FOR RETREADING TIRES
Raymond P. Hawkinson, Minneapolis, Minn., assignor to Paul E. Hawkinson Company, Minneapolis, Minn., a corporation of Minnesota
Filed June 25, 1962, Ser. No. 204,855
2 Claims. (Cl. 18—44)

My invention relates generally to the art of retreading and more specifically to the art of applying top caps to worn pneumatic tire casings.

Still more specifically, my invention relates to the applying of inlaid tread bands by the well-known "Hawkinson System" of treading as disclosed in U.S. Patents Nos. 1,917,261 and 1,917,262.

The primary object of my invention is the provision of a novel retread mold of the Hawkinson type which may be used to apply an endless tread band to the periphery of a tire intermediate wide cylindrical shoulder portions thereon, a portion of said tread band being recessed below the level of said shoulders and a portion of which projects radially outwardly from the level of said shoulders.

A further object of my invention is the provision of a mold of the type immediately above described which, by virtue of its construction, will turn out recapped tires which appear precisely as new ones.

A still further object of my invention is the provision of a mold of the type above described which comprises an endless cast metal matrix, marginal edge portions of which are formed to provide relatively wide cylindrical sealing flanges for engagement with cylindrical shoulder portions on the casing, which remain as a result of buffing a tread band-receiving recess in the crown of the casing intermediate the shoulders thereof.

A still further object of my invention is the provision of a mold of the type above described wherein said matrix, intermediate said wide sealing flanges, is formed to define a tread-molding cavity, and in which the opposed side edges of said flanges within said recess are formed to define circumferentially spaced radially extending design-forming fingers which project radially inwardly beyond said sealing flanges and are adapted to make centering engagement with the opposite side walls of a tread-receiving recess formed in said tire casing between the cylindrical shoulder portions.

The above and still further objects of my invention will become apparent from the following detailed specification, appended claims and attached drawings.

Referring to the drawings wherein like characters indicate like parts throughout the several views.

Figure 1:
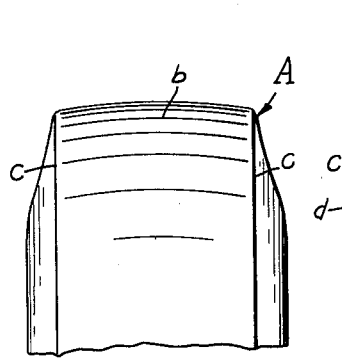
FIG. 1 is a fragmentary view in front elevation of a worn or bald-headed tire casing.

Referring with greater particularity to the drawings, the numeral 1 indicates a cylinder-like mold-forming band formed from suitable sheet metal. Opposite side edge portions of the band 1 are bent radially outwardly to define annular reinforcing flanges 2. Between the flanges 2, the convolutions of a heating conduit 3 are wound and secured to the radially outer surface 4 thereof by means of soldering, brazing, or the like. Received within the mold-forming band 1 in engagement with the radially inner surface 5 thereof is an endless matrix 6 which preferably is formed from cast aluminum or other metal having high heat conductivity, and comprises a plurality of segmental sections 7 in end-to-end relationship.

Figure 5:
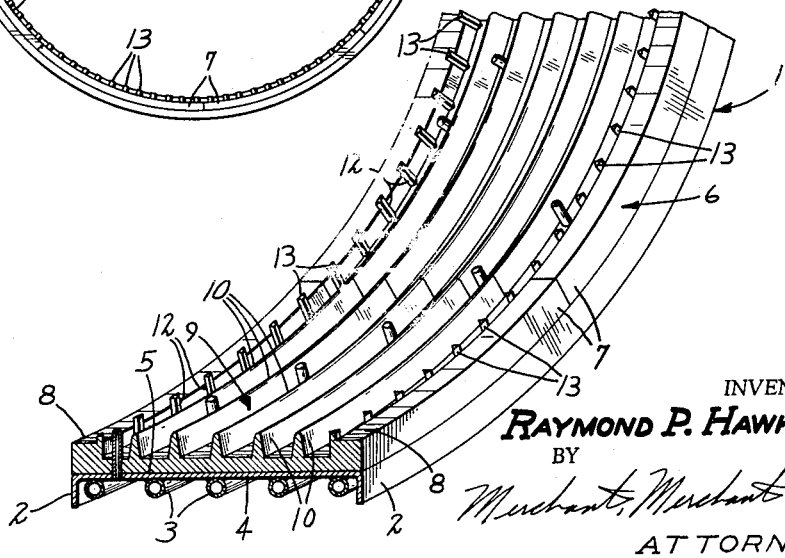
FIG. 5 is a fragmentary view in perspective of a portion of the structure of FIG. 4.
Figure 6:
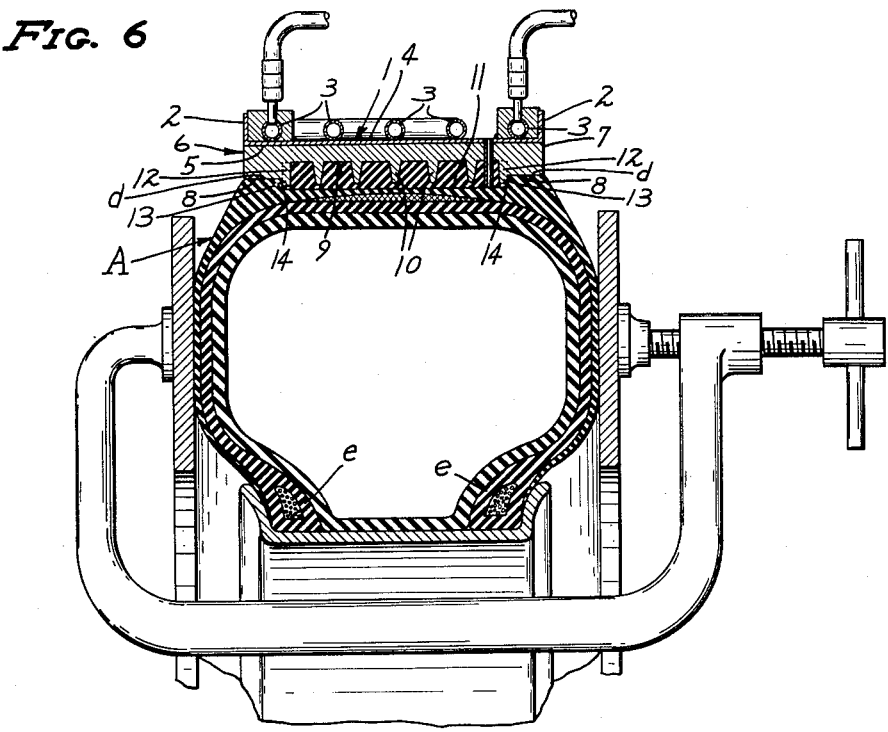
FIG. 6 is a view in transverse section showing the relative design of my novel mold and a pneumatic tire during curing thereof.
Figure 7:
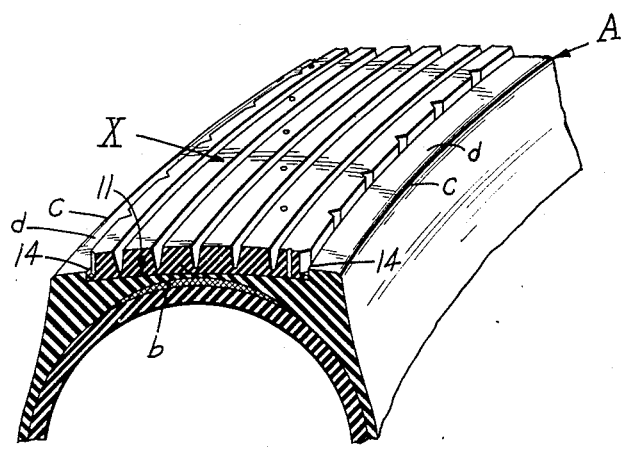
FIG. 7 is a fragmentary view in perspective of the tire casing cured in accordance with FIG. 6.

Opposite side edges of the matrix 6 are formed to define relatively wide cylindrical sealing flanges 8. Intermediate the sealing flanges 8 the matrix 6 is recessed to define a tread-molding cavity 9. Suitable tread design-forming ribs 10 are defined by the matrix 6 in the recess 9. For the purpose of imparting a design to the opposite side edges of a tread band X to be formed partly within the tread-molding cavity 9 and partly within an inlay recess 11 in the crown portion of a tire casing A, I provide circumferentially spaced radially extended design-forming fingers 12 on the opposed faces of the sealing flanges 8 within the tread-molding cavity 9. As shown particularly in FIGS. 5 and 6, these tread-design-forming fingers project radially inwardly beyond the level of the sealing flange 8, as indicated by the numeral 13, so as to also impart a design to that portion of the tread band X which is formed within the recess 11 formed in the crown of the casing A. A further and highly important function of the radially inwardly projecting portions 13 of the fingers 12 is that they engage opposite side edges 14 of the recess 11 formed in the crown portion of the casing A so as to center the matrix 6, and parts associated therewith, with respect to the casing A.

Figure 2:
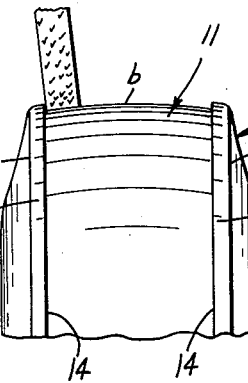
FIG. 2 is a view corresponding to FIG. 1 but showing the step of buffing same.

Further with respect to the use of my novel matrix, FIG. 1 illustrates a conventional tire casing, the crown portion b of which is worn relatively smooth. FIG. 2 illustrates means of buffing the tire for use with my novel recapping mold above described. As there shown, a tread band-receiving recess 11 is formed in the crown b of the casing intermediate the shoulders c thereof, whereby to form on opposite sides of said recess 11 relatively wide cylindrical shoulder portions d. Preferably, the recess 11 should be formed by use of a precision buffing device such as is shown in U.S. Patent No. 2,645,147, utilizing an abrading device such as is disclosed in Patent No. 2,240,559.

Figure 3:
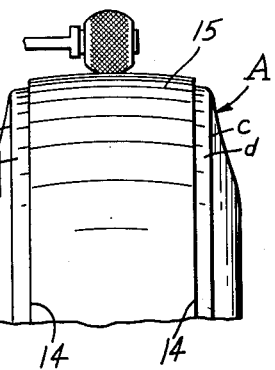
FIG. 3 is a view corresponding to FIG. 2 but showing the step of stitching on the uncured camelback.
Figure 4:
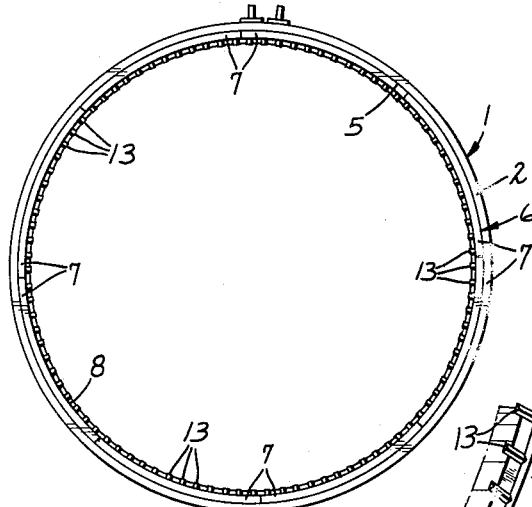
FIG. 4 is a view in side elevation of my novel curing mold.

After suitably cementing the surface defined by the recess 11, a band of uncured camelback 15 is secured to the crown b of the casing A within said recess 11, FIG. 3 illustrating the conventional stitching of the band 15 to the casing A.

At this stage, the casing A is reduced in circumference by spreading the beads e in the manner taught by U.S. Patent No. 1,917,261, and my novel mold-matrix 1–6 combination is placed in operative position thereabout, with the sealing flanges 8 in engagement with the smooth and unbuffed shoulder portions d, and with the recess 11 in the crown b in alignment with the tread-molding cavity 9 formed in the matrix 6.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

What I claim is:
1. A pneumatic tire recapping device comprising:
   (a) a cylinder-like cast-metal matrix,
   (b) opposite side edges of said matrix defining cylindrical sealing flanges for engagement with cylindrical shoulder portions formed on opposite sides of a tire to be recapped therein,
   (c) said matrix intermediate said sealing flanges being recessed to define a tread-molding cavity,

(d) opposite side edge portions of said sealing flanges within said molding cavity being formed to define circumferentially spaced, radially extending design-forming fingers, (e) said fingers projecting radially inwardly beyond said sealing flanges and adapted to make centering engagement with opposite side walls of a tread-forming recess formed in said casing between said shoulder portions.

2. In a tread band securing and vulcanizing device comprising a cylindrical matrix having axially spaced annular ring flange portions adapted to seat upon and seal with annular spaced shoulders of a tire case being recapped and having intermediate tread molding ribs of less internal diameter than said spaced shoulders so as to extend radially into the recessed tread portion between said spaced shoulders;

(a) the improvement comprising an annular series of widely spaced finger members on the opposed sides of said ring flange portions and extending radially outwardly thereon for substantially the depth of said ribs, and radially inwardly for a substantially greater distance than said ring flanges, whereby to guide and provide improved securement and vulcanization of relatively wide cylindrical edge portions of said tread band with adjacent opposed shoulder portions of said tire casing.

References Cited in the file of this patent

UNITED STATES PATENTS

| | | |
|---|---|---|
| 2,065,696 | Hawkinson | Dec. 29, 1936 |
| 2,232,001 | Hawkinson | Feb. 18, 1941 |
| 2,894,310 | Hogan et al. | July 14, 1959 |

FOREIGN PATENTS

| | | |
|---|---|---|
| 490,273 | Great Britain | Aug. 11, 1938 |
| 107,978 | Sweden | July 20, 1943 |